(12) United States Patent
Ledingham

(10) Patent No.: US 6,991,086 B2
(45) Date of Patent: Jan. 31, 2006

(54) BENDABLE ROLLING CONVEYOR GUIDE

(76) Inventor: Stuart J. Ledingham, 23131 Pradera Rd., Coto de Caza, CA (US) 92679

( * ) Notice: Subject to any disclaimer, the term of this patent is extended or adjusted under 35 U.S.C. 154(b) by 0 days.

(21) Appl. No.: 10/789,629

(22) Filed: Feb. 27, 2004

(65) Prior Publication Data

US 2004/0163925 A1 Aug. 26, 2004

Related U.S. Application Data

(63) Continuation-in-part of application No. 10/366,592, filed on Feb. 11, 2003, now abandoned, which is a continuation of application No. 09/706,460, filed on Nov. 3, 2000, now Pat. No. 6,516,933.

(51) Int. Cl.
*B65G 47/26* (2006.01)

(52) U.S. Cl. ................................. 198/454; 198/453
(58) Field of Classification Search ................ 198/453, 198/454; 193/35 R, 35 MD
See application file for complete search history.

(56) References Cited

U.S. PATENT DOCUMENTS

| | | | |
|---|---|---|---|
| 2,593,089 A | | 4/1952 | Barry |
| 2,920,734 A | | 1/1960 | Heinrich |
| 3,045,791 A | | 7/1962 | Ayres |
| 3,103,271 A | | 9/1963 | Christiansen, Jr. |
| 3,934,706 A | * | 1/1976 | Tice ............................ 198/454 |
| 3,954,170 A | | 5/1976 | Schlough |
| 4,962,843 A | * | 10/1990 | Ouellette ..................... 198/453 |
| 5,143,200 A | * | 9/1992 | Fuller .......................... 198/453 |
| 5,160,014 A | * | 11/1992 | Khalar ........................ 198/453 |
| 5,435,427 A | | 7/1995 | Guiher |
| 6,079,544 A | | 6/2000 | Donati et al. |
| 6,419,069 B1 | | 7/2002 | Teramachi |
| 6,516,933 B1 | | 2/2003 | Ledingham |
| 6,561,340 B2 | * | 5/2003 | Reatti ......................... 198/454 |

FOREIGN PATENT DOCUMENTS

| | | |
|---|---|---|
| EP | 0 888 985 | 1/1999 |
| EP | 0 893 373 | 1/1999 |
| EP | 1 340 698 A1 | 9/2003 |

OTHER PUBLICATIONS

New Product Brochure of MAR BETT Conveyor Components describing Part. 580–581 (Snap–on Roller Side Guide), p. 1, Jan. 1998.
New Product Brochure of MAR BETT Conveyor Components describing Part. 578 (Modular Roller Transfer Guide), pp. 1–2, Jan. 1998.
Catalog of Conveyor Components, Custom Plastics, Industrial Parts by Valu Guide, Nolu Plastics, Solus Industrial Innovations. vol. 1, p. 41, Jul. 2000.
Catalog of Conveyor Components by System Plast, pp. 185, 186, 189 and 195, Nov. 1998.

* cited by examiner

*Primary Examiner*—James R. Bidwell
(74) *Attorney, Agent, or Firm*—Knobbe Martens Olson & Bear LLP

(57) ABSTRACT

Readily bendable rolling conveyor guides are provided. The guides include axle-positioning members having notches. The axle-positioning members slidably engage channels of a structural support member. A plurality of axles carrying rotatable elements and spacers are disposed between the axle-positioning members. Due to the notches in the axle-positioning members and the unique cross-section of the exterior of the channels, the assembled guides may be bent at small radii without causing distortion of the channels or interference between the axle-positioning members and the channels.

26 Claims, 14 Drawing Sheets

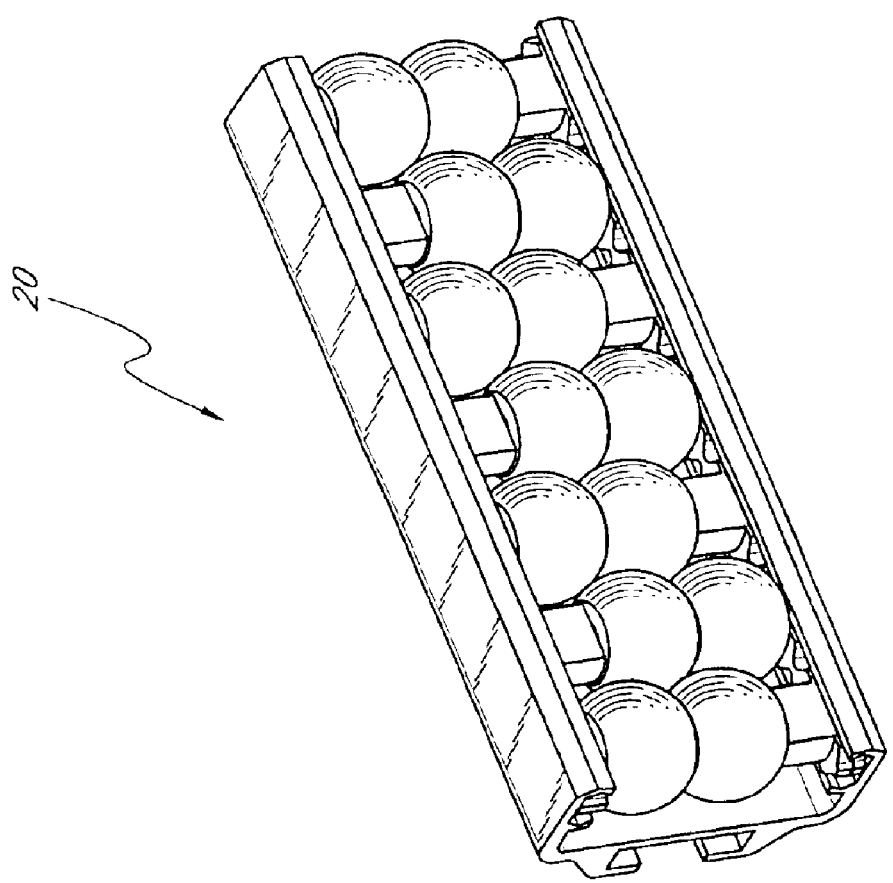

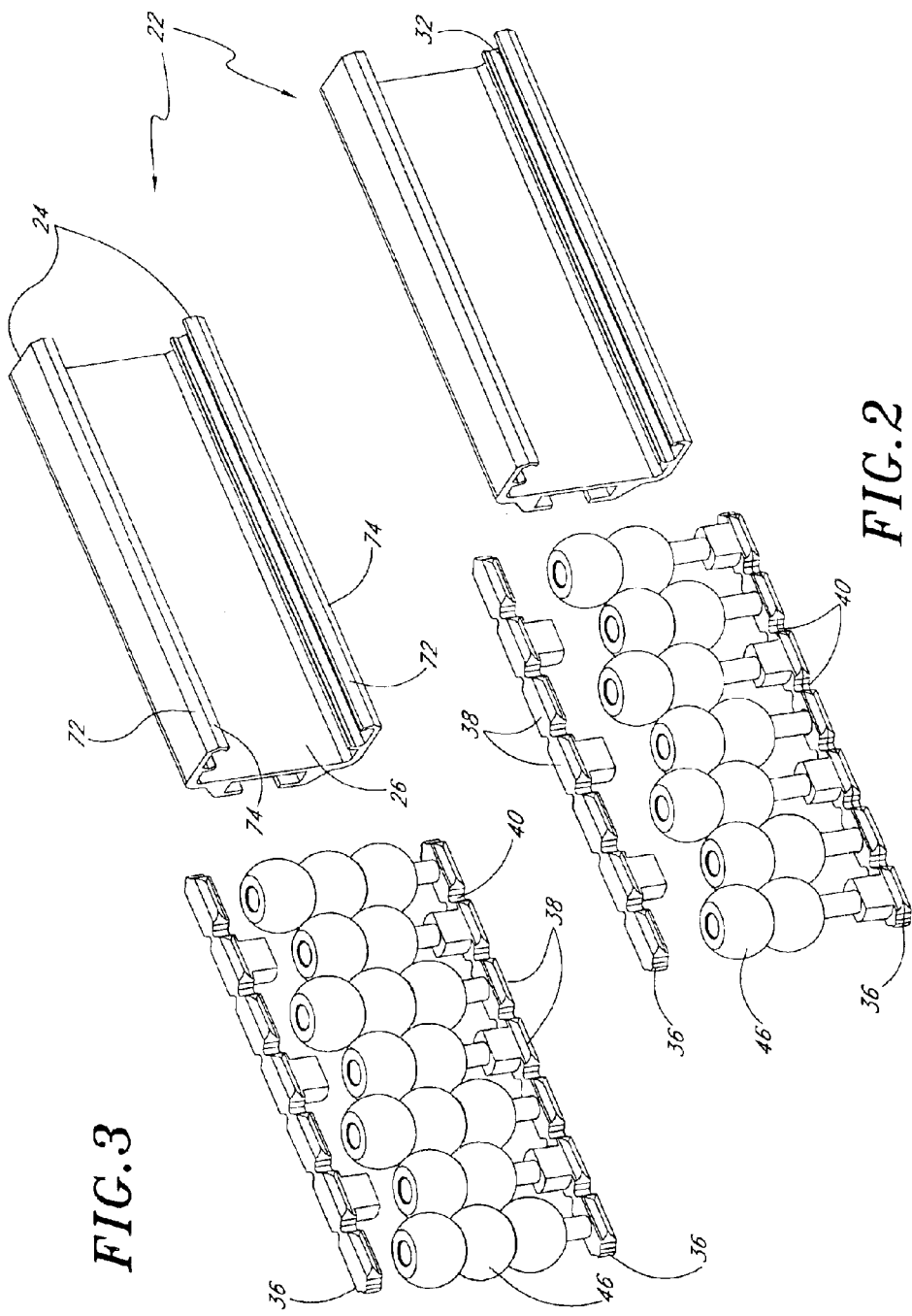

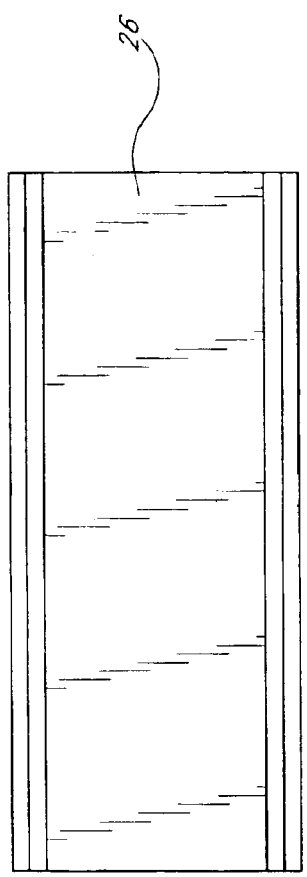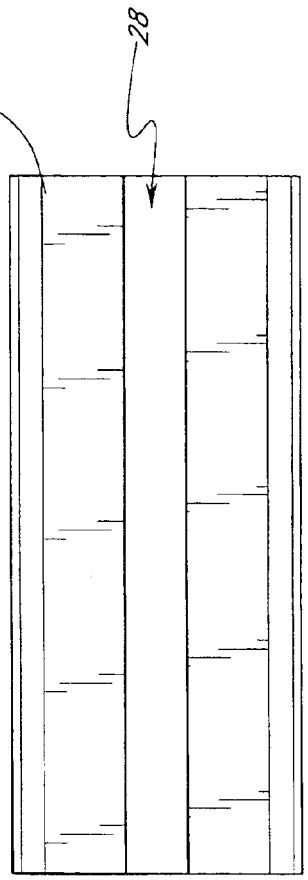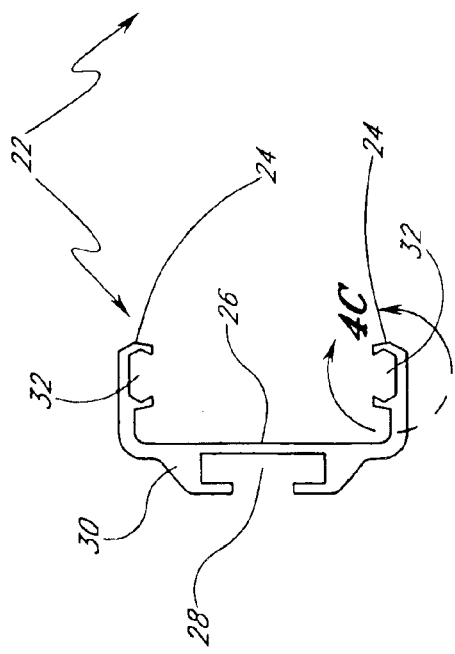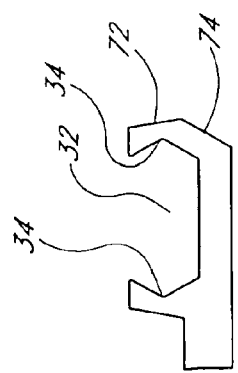

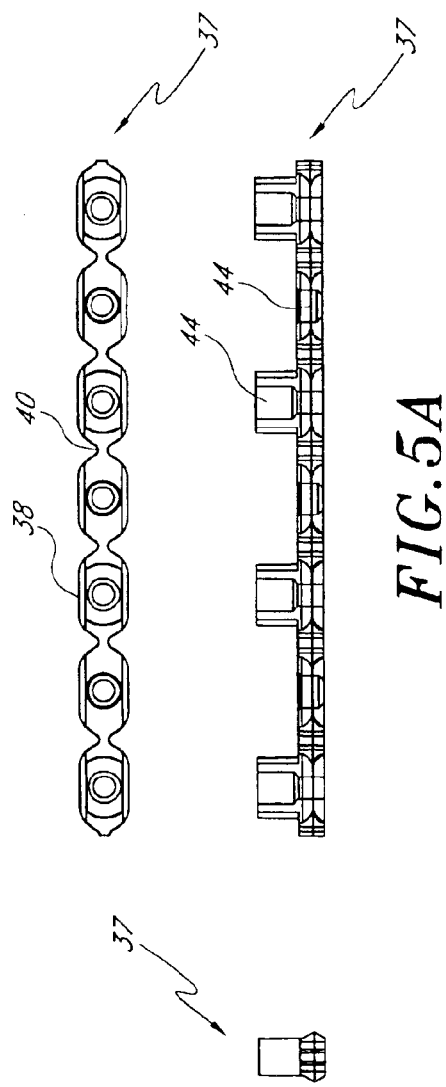
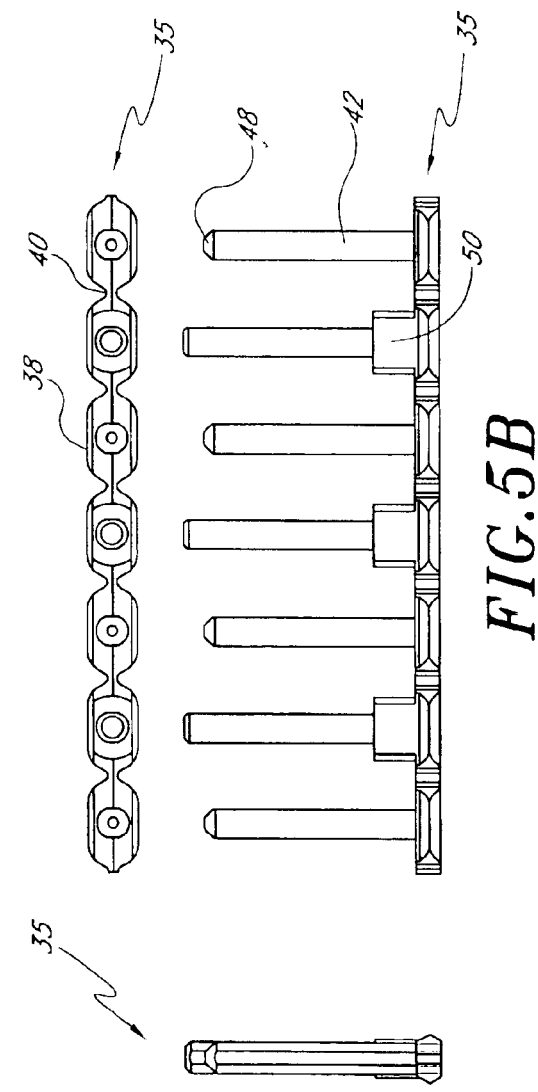
FIG.5A
FIG.5B

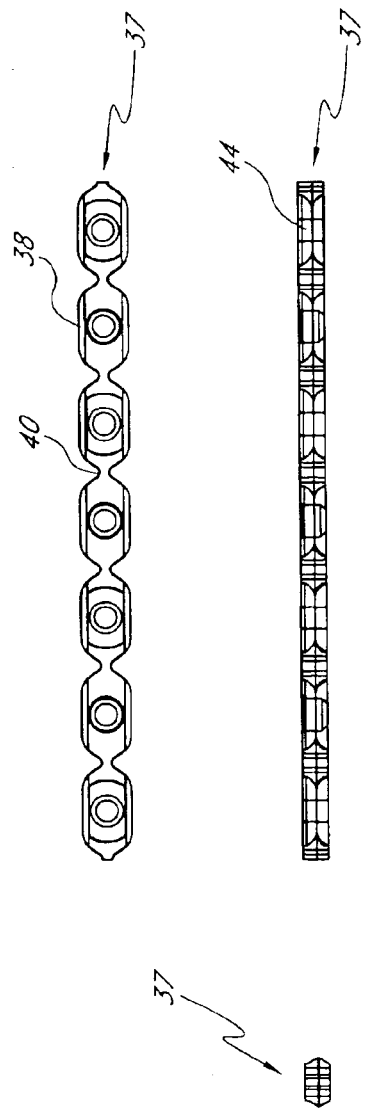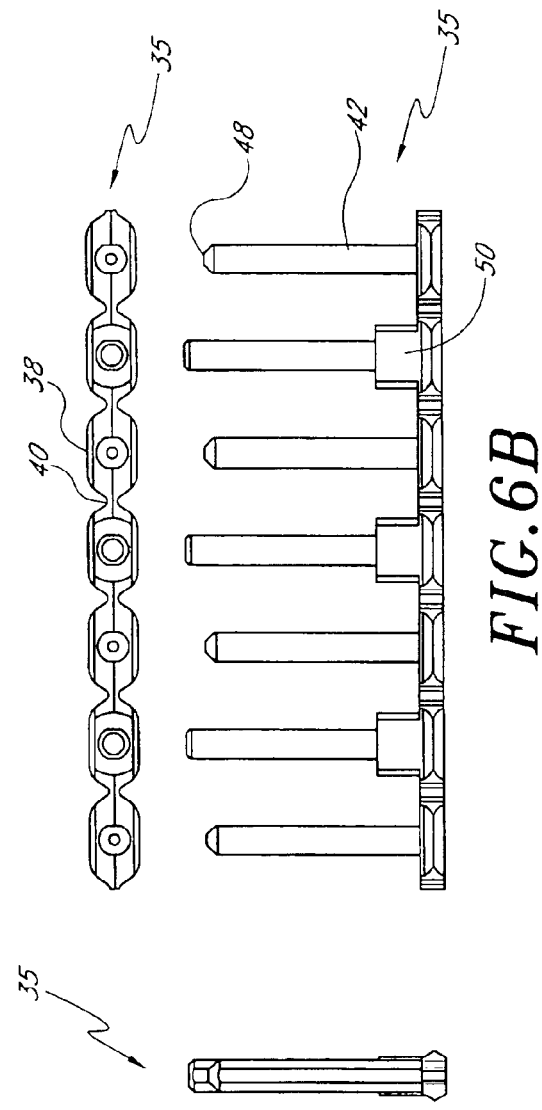

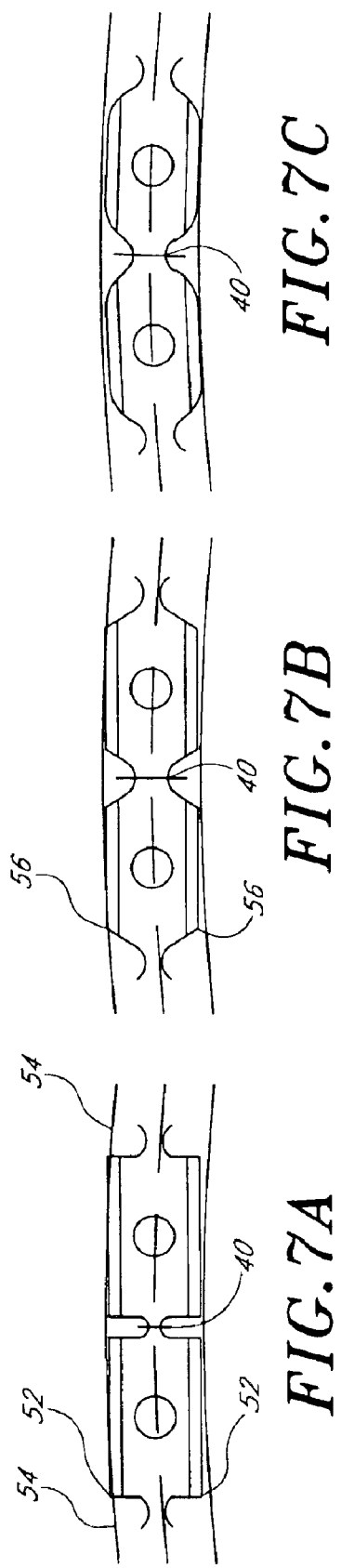

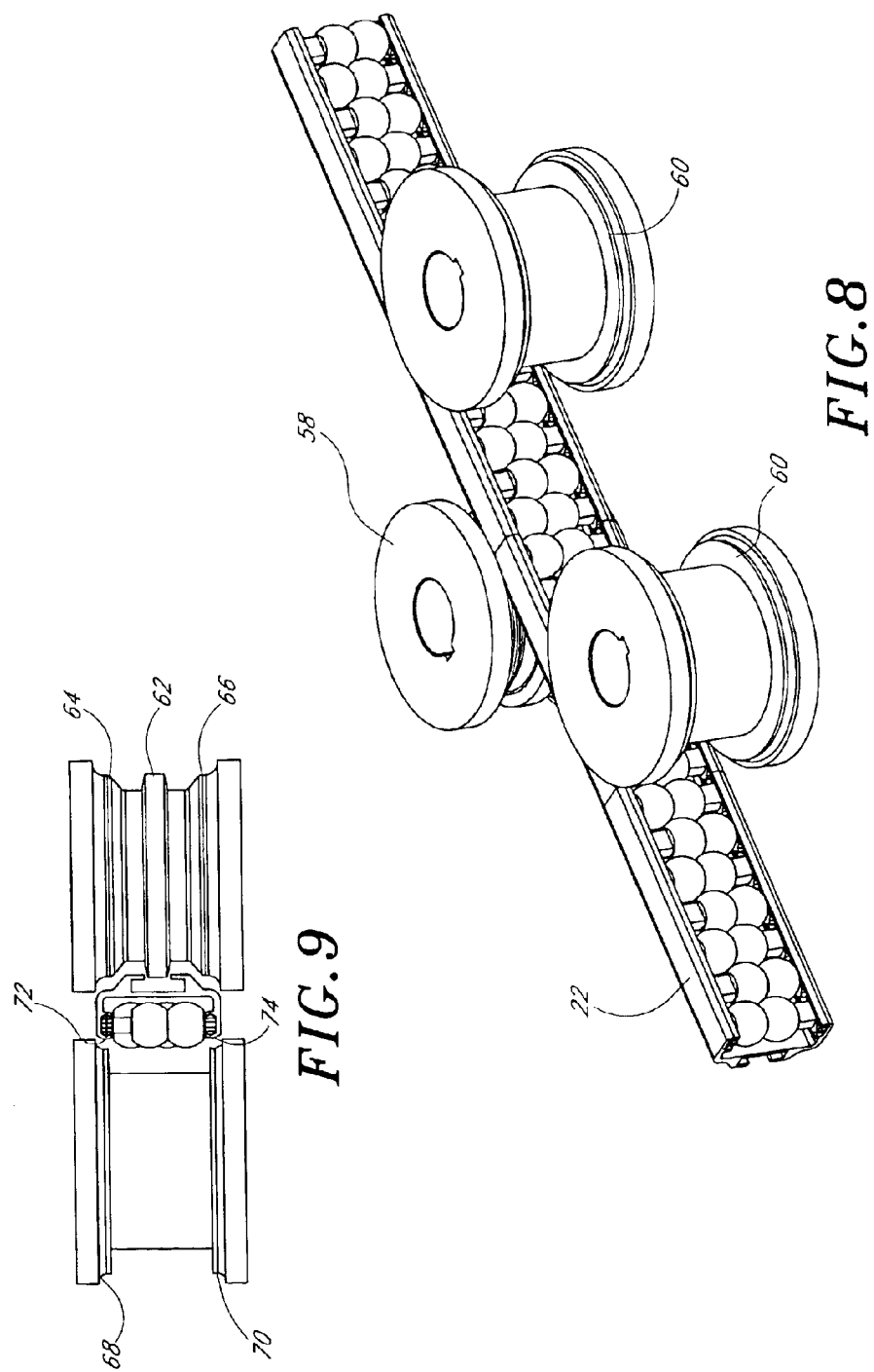

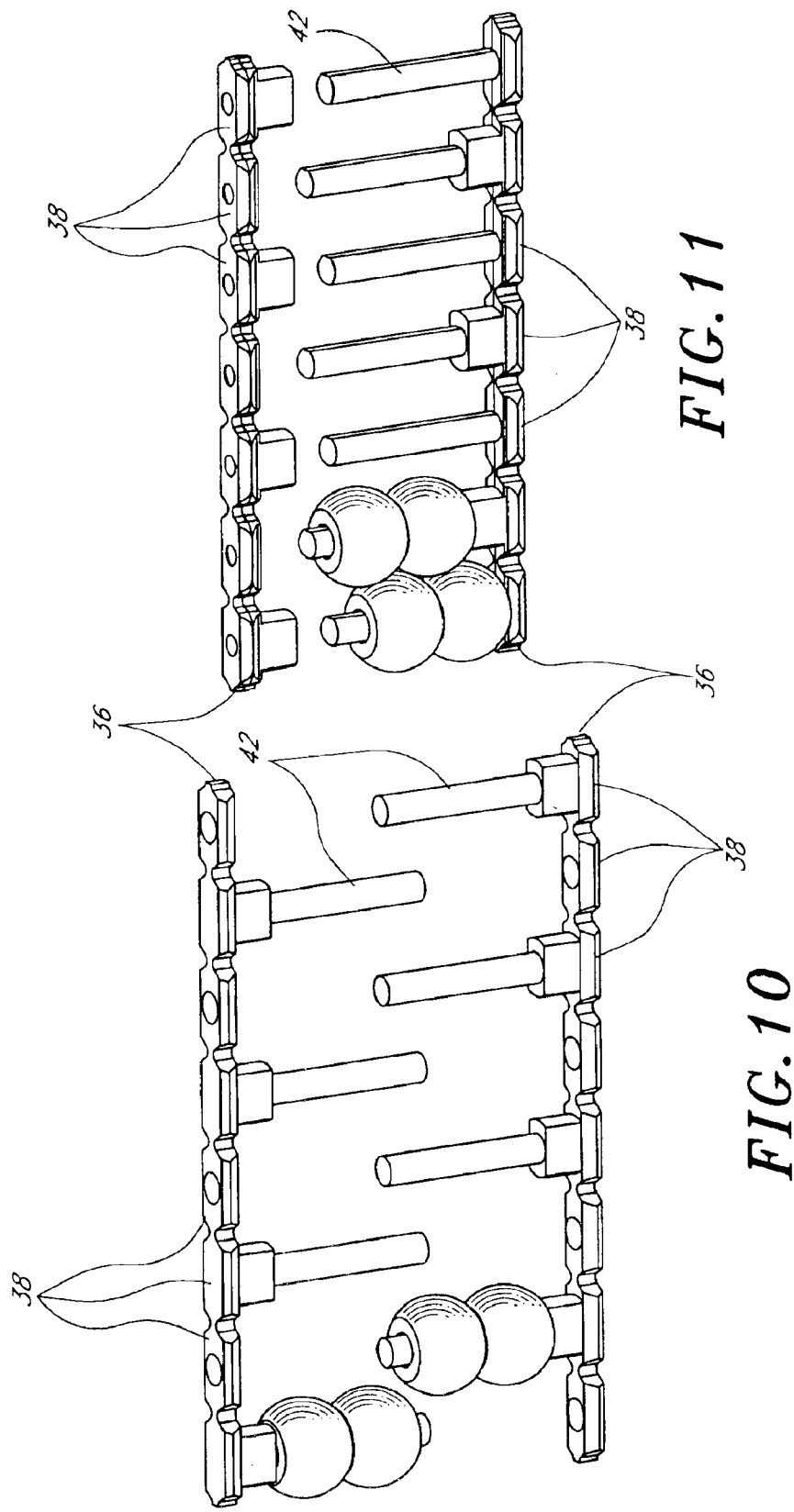

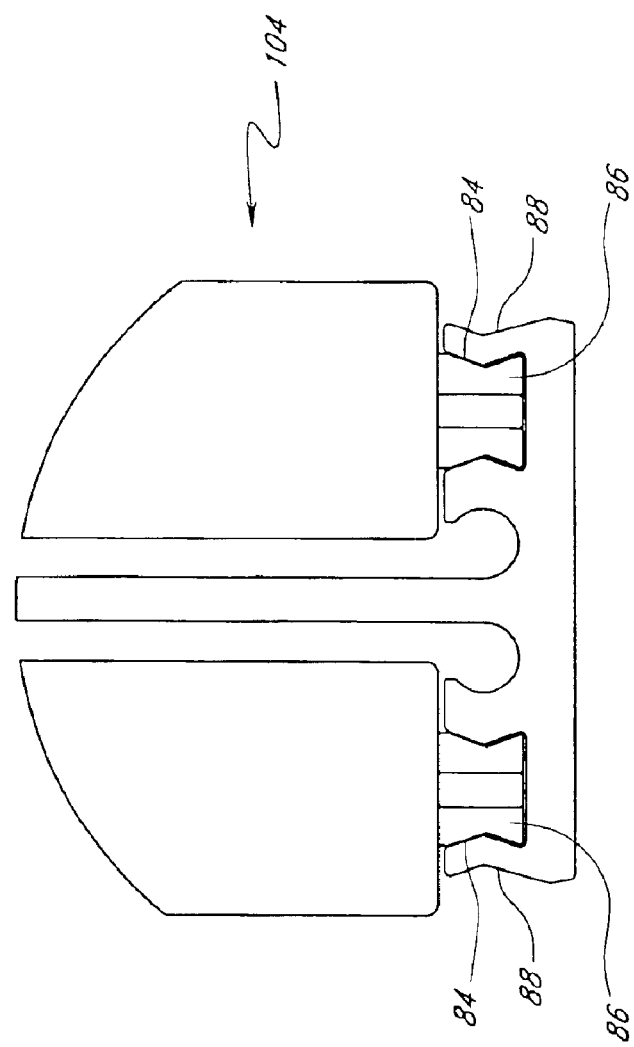
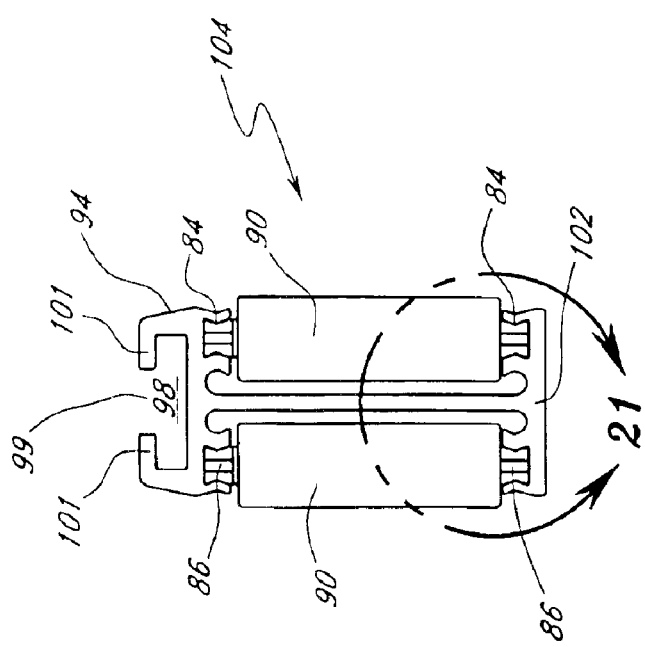

BENDABLE ROLLING CONVEYOR GUIDE

RELATED APPLICATIONS

This application is a continuation-in-part of application Ser. No. 10/366,592, filed on Feb. 11, 2003 now abandoned, which is a continuation of application Ser. No. 09/706,460, filed on Nov. 3, 2000, now U.S. Pat. No. 6,516,933. The entire contents of these applications are hereby expressly incorporated by reference.

BACKGROUND OF THE INVENTION

1. Field of the Invention

The present invention relates to guides for installation along the sides of a container-transporting conveyor system. More specifically, the present bendable rolling conveyor guide is adapted for installation along both curved and straight sections of a conveyor system.

2. Description of the Related Art

Guides mounted on opposite sides of conveying systems are used in a variety of places in industrial installations. For example, they are used for combining (channeling a wide procession of conveyed articles in a disorderly array into a single file), forcing articles around bends in the conveying system, or simply preventing articles from falling off the side of the conveyor. Generally, there is at least one guide mounted on each side of the conveyor.

Guides may either be fixed or rolling, depending upon the nature of the guide surface that contacts the conveyed articles. Fixed guides provide a smooth surface for articles to contact, while rolling guides provide rotatable elements mounted upon vertical axles. Guides of both types provide a low friction guiding surface for a large variety of individual containers including glass, metal, plastic and paperboard, and packages like cardboard boxes, and plastic wrapped bundles or trays. Excess friction in any of these applications can cause line stoppage, package jamming and possible damage, product spillage or skewed orientation.

In powered conveyor applications especially, fixed guides generally provide too much friction to be useful, especially when a container or package must be guided around a turn or through a transfer from one conveyor to another. Rolling guides are an excellent solution to these problems. In some curved sections of conveyors, there is only a rolling guide on one side of the conveyor, with a fixed guide on the other side. Where only one rolling guide is used, the rolling guide is usually mounted on the outside, or larger radius, of the curve.

Rolling guides are often constructed in a similar manner. A rolling member is positioned on a shaft or axle and contacts the product/package surface. Sizes of rolling members, and heights of rolling guides, vary. Guides can be from one inch with one member to ten inches with fifteen-plus members. Rolling members can interlock (nest) or stand adjacent. A dense interlocked pattern is preferred, because the interlocking members minimize gaps that tend to catch passing articles. The axles are in turn connected to a structural supporting member by means of an axle-positioning plastic cap. Aluminum extrusions, bars of steel or aluminum and formed sections of sheet metal are the most common materials for the supporting member.

For economic reasons, guides are generally manufactured in standard lengths. However, applications for guides often require unique bead lengths. Therefore, either each length must be amenable to being cut and/or bent by the purchaser to conform to each application, or the purchaser must special order the specific lengths and radii of guides needed, which is typically a more expensive option.

Examples of rolling guides are shown in U.S. Pat. Nos. 3,934,706, 4,962,843 and 5,143,200, and VALU GUIDE Model #684. Each of these guides generally comprises an upper and a lower frame member that are adapted to be mounted alongside and parallel to the conveyor. U.S. Pat. No. 4,962,843 comprises a plurality of vertically stacked frame members. A plurality of axles are disposed between the frame members, usually with the longitudinal axis of each axle oriented perpendicularly to the conveying surface. Rotatably attached to the axles are beads, which are generally spherical, or rollers, which are generally cylindrical with protruding flanges that are either round or polygonal.

This guide configuration is particularly useful for combining, where each guide is straight. However, none of these guides are easily bent after they have been assembled. Bending these guides often results in radical deformation of the supporting structure and even failure. Therefore, none of these guides are well suited for use in curved sections of a conveying system unless they are custom manufactured to meet a particular customer's need.

Two examples of guides that are more easily bent by the purchaser are the Marbett Model # 580 and 581, and the System Plast device. Each length of these guides comprises multiple short sections of frame members that are all flexibly attached to one another by means of plastic hinges. The back side of each section contains a channel that is adapted to be slidably attached to a bent mounting strip. These designs have some major drawbacks, however. First, the minimum bending radii are rather high (approximately 13" for an internal curve, and 15" for an external curve for the Marbett, and approximately 18" for an internal curve, and 24" for an external curve for the System Plast). A plant layout requiring tighter radii would not be able to use these guides. Second, because the device only bends between sections, and each section contains four axles, it does not provide an entirely smooth curve. The transition points between sections have a tendency to catch passing articles on the conveyor, leading to jamming.

The design of all of the above-mentioned guides also makes them more expensive to manufacture. The axles must first be inserted into an axle-positioning member. After the rotatable elements have been installed, every single axle must be lined up properly before the other axle-positioning member can be secured to the other end of the axles. This is a very tedious process that is difficult to automate.

A guide that is easily and cheaply manufactured, easily bent by the purchaser, is capable of being bent to small radii, and that doesn't have a tendency to cause conveyed articles to jam would be of great benefit in any industry that uses conveyors.

SUMMARY OF THE INVENTION

The present bendable rolling conveyor guide has several features, no single one of which is solely responsible for its desirable attributes. Without limiting the scope of this bendable rolling conveyor guide as expressed by the claims that follow, its more prominent features will now be discussed briefly. After considering this discussion, and particularly after reading the section entitled "Detailed Description of the Preferred Embodiments," one will understand how the features of this bendable, rolling conveyor guide provide advantages, which include ease of assembly and ability to be bent by the purchaser.

The present bendable rolling conveyor guide is easy to bend, and is thus readily adaptable for use in any conveyor layout. The bendable rolling conveyor guide includes any number of axles disposed between a pair of chain-like axle-positioning members. The axles serve as mounting points for rotatable elements such as rollers or beads. The axles and/or spacers may be molded integrally with the axle-positioning members. The axle-positioning members slidably engage two channels in a structural support member. The axle-positioning members are rigid but readily bendable due to evenly spaced notches cut in the edges of the axle-positioning member. The shape of the notches ensures that the axle-positioning members will not interfere with the interior walls of the channels when the entire assembly is bent. Outer surfaces of the structural support member are shaped so as to mate with surfaces of a bending tool. Inter-engagement of the structural support member with the bending tool minimizes distortion of the structural support member during the bending operation. The structural support member is readily bent to theoretical radii as small as 5".

BRIEF DESCRIPTION OF THE DRAWINGS

The preferred embodiments of the present bendable rolling conveyor guide, illustrating its features, will now be discussed in detail. These embodiments depict the novel and non-obvious bendable rolling conveyor guide shown in the accompanying drawings, which are for illustrative purposes only. These drawings include the following Figures, in which like numerals indicate like parts:

FIG. 1 is a perspective view of a preferred embodiment of the present bendable rolling conveyor guide;

FIG. 2 is an exploded perspective view of the bendable rolling conveyor guide of FIG. 1;

FIG. 3 is an exploded perspective view of another preferred embodiment of the present bendable rolling conveyor guide, illustrating another preferred bead and spacer arrangement;

FIGS. 4A–4D are side, front, side detail and rear views, respectively, of the channel member of the bendable rolling conveyor guide of FIG. 1;

FIG. 5A depicts front, side and top views of a preferred embodiment of the axle-positioning member of the present bendable rolling conveyor guide;

FIG. 5B depicts front, side and top views of another preferred embodiment of the axle-positioning member of the present bendable rolling conveyor guide;

FIG. 6A depicts front, side and top views of another preferred embodiment of the axle-positioning member of the present bendable rolling conveyor guide;

FIG. 6B depicts front, side and top views of another preferred embodiment of the axle-positioning member of the present bendable rolling conveyor guide;

FIGS. 7A–7C are top detail views of preferred embodiments of the axle-positioning member of the present bendable rolling conveyor guide;

FIG. 8 is a perspective view of a preferred apparatus for bending the present bendable rolling conveyor guide;

FIG. 9 is a side view of the bending apparatus of FIG. 8;

FIG. 10 is a perspective view of another preferred embodiment of the axle-positioning member of the present bendable rolling conveyor guide, illustrating a bi-directional, non-chamfered axle design;

FIG. 11 is a perspective view of another preferred embodiment of the axle-positioning member of the present bendable rolling conveyor guide, illustrating a uni-directional, non-chamfered axle design;

FIG. 20 is a side view of the bendable rolling conveyor guide of FIG. 18; and

FIG. 21 is a side detail view of the lower portion of the bendable rolling conveyor guide of FIG. 18.

DETAILED DESCRIPTION OF THE PREFERRED EMBODIMENTS

Figure 12:
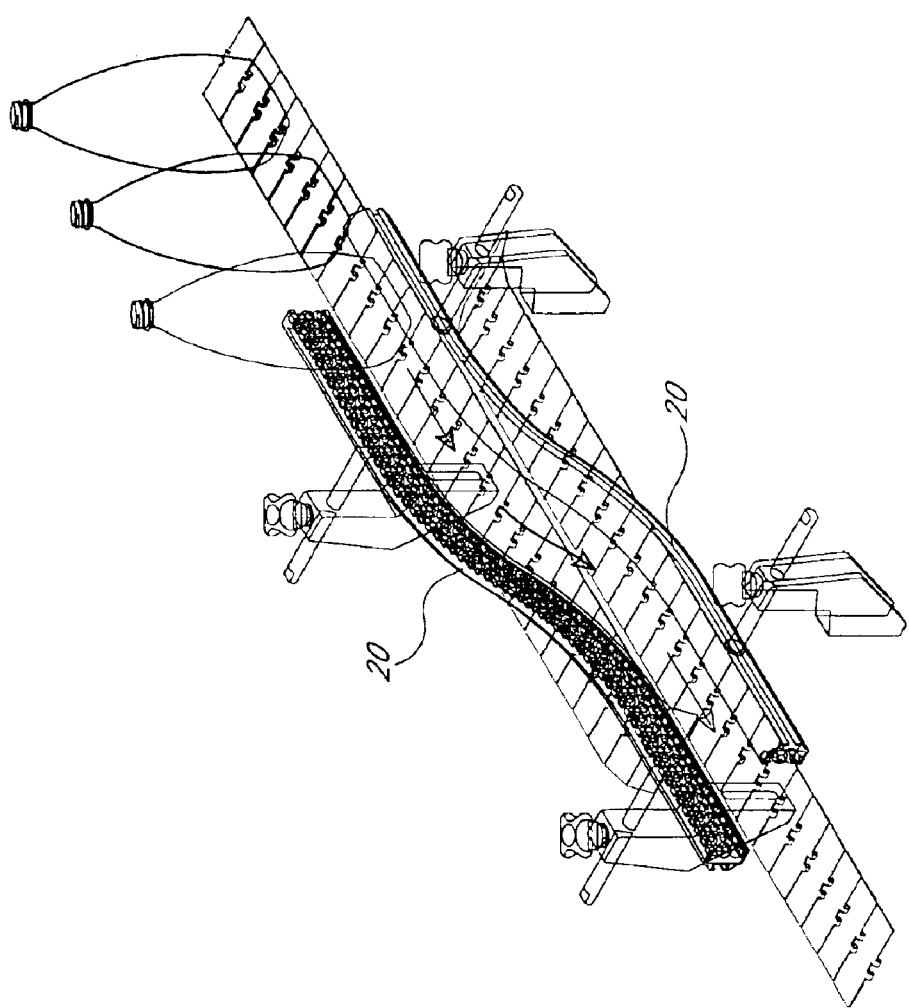
FIG. 12 is a perspective view of a preferred embodiment of the present bendable rolling conveyor guide disposed along a conveyor transfer.
Figure 14:
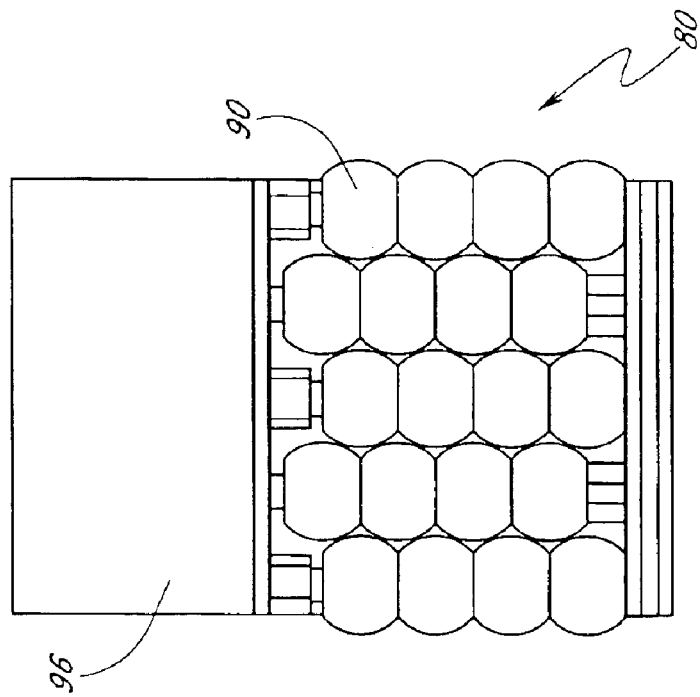
FIG. 14 is a front view of the bendable rolling conveyor guide of FIG. 13.

FIG. 1 illustrates a fully assembled length of a preferred embodiment of the present bendable rolling conveyor guide 20. The individual components of the guide 20 are illustrated in FIGS. 2–6. The guide 20 includes an elongate structural support member 22, shown in detail in FIG. 4. This member 22 has a generally U-shaped cross-section, with two equal length extension arms 24 connected by a span 26. The support member 22 is adapted to be mounted on an appropriate surface alongside the conveyor by means of a channel 28 running along the length of the back surface 30 of the support member 22. The channel 28 is adapted to slidably engage a support surface, such as a strip of material, or a fastening member, such as a bolt head.

Each extension arm 24 preferably includes a generally U-shaped channel 32 in spaced relationship with the span 26, with the open sides of each channel 32 facing one another. Each channel 32 has oppositely disposed V-shaped grooves 34 that are adapted to slidably engage an axle-positioning member 36.

The axle-positioning member 36 shown in FIGS. 2, 3, 5A, 5B, 6A and 6B includes two oppositely disposed chain-like strips, each having a cross-section that is adapted to fit snugly within, and be retained by, the channel 32 of the extension arm 24. Each strip is divided into individual links 38 by uniformly spaced notches 40 along the length of the strip. Although the Figures show a length of the axle-positioning member 36 having seven links, those of skill in the art will appreciate that this member 36 and the support structure 22 in which it is housed could be manufactured in any of a variety of lengths having any number of axles 42.

In a preferred embodiment, each link 38 of one strip has an integrally formed elongate axle 42 extending from the center of the surface facing the other strip, and each link 38 of the other strip has a central socket 44 adapted to receive the end of an axle 42. Each axle 42 is generally cylindrical and adapted to receive at least one rotatable element 46, such as a bead or roller. In a preferred embodiment, the ends of each axle 42 include a chamfer 48 that facilitates insertion of the axle 42 end into the socket 44 by eliminating the need for all axles 42 to align exactly with all sockets 44 at the same time. The length of each axle 42 is variable depending on the number of rotatable elements 46 that are to be installed on each one.

The rotatable element 46 on each axle 42 may stand adjacent to the rotatable element 46 on the neighboring axles 42, or they may be offset so that they interlock. FIGS. 2 and 3 illustrate the interlocked configuration. An interlocked pattern is preferred, because it minimizes many of the gaps between elements 46 that tend to trap conveyed articles as they pass. If the elements 46 are to be offset, at least every other axle 42 preferably includes one or more spacers 50 (FIG. 5B). In order to make assembly of the bendable rolling conveyor guide 20 easier, spacers 50 may be formed integrally with some or all of the links 38 of each strip. In a preferred embodiment, every other link 38 has an integrally formed spacer 50 attached to the surface facing the other strip. Depending upon the rotatable element 46 arrangement desired, spacer 50 orientation may either be opposing, as in FIG. 3, or alternating, as in FIG. 2. Also, the heights of each of the axles 42 may alternate, as in FIGS. 5B and 6B, depending on how the spacers 50 and rotatable elements 46 are to be arranged.

Those of skill in the art will appreciate that it is not necessary to mold spacers 50 integrally with the links 38. However, such integral molding facilitates assembly of the entire guide 20, reducing the overall difficulty and cost of making the guide 20. Those of skill in the art will also appreciate that it is not necessary to mold the axles 42 integrally with the spacers 50 or the links 38. For example, the axles 42 could be formed as separate cylindrical pins, each pin having opposite ends that fit into the sockets 44 in the links 38.

The axle-positioning member 36 can be made of any material suitable to withstand the anticipated loads upon the conveyor guide 20 and to have a low-friction compatibility with the rotatable elements 46, which are most often acetal or polypropylene or nylon. Metals provide greater strength than plastics, but plastics are easier to mold. Thus, if metals must be used, the economic advantages associated with integrally molding the spacers 50 and the links 38 may be lost. When acetal rotatable elements 46 are used and expected loads are relatively light, the member 36 may be manufactured from a material such as PBT which is preferred for reduced friction and structural strength.

The axles 42 may also be made of any material suitable to withstand the anticipated loads upon the conveyor guide 20 and to have a low-friction compatibility with the rotatable elements 46. If the axles 42 are to be formed integrally with the spacers 50 and the links 38, then these components are preferably molded from plastics in order to achieve the cost savings described above. However, if the axles 42 are to be formed separately from the spacers 50 and the links 38, then the axles 42 may easily and cheaply be machined from metals and inserted into the sockets 44 in the links 38 during the assembly process. Metal axles 42 may, for example, be used when the anticipated loads on the conveyor guide 20 are great.

FIGS. 7A–7C illustrate the design of the notches 40 between the links 38 of each strip. In FIG. 7A, the links 38 have square corners 52. These corners 52 interfere with the side walls 54 of the extension arm channel 32 when the entire assembly 20 is bent. The interference leads to two problems. First, it makes it difficult, if not impossible, to remove the axle-positioning members 36 from the channel 32.

Second, it places strain on the links 38 that can lead to upsetting the orientation of the axles 42. Because the rotatable members 46 are preferably in close proximity to one another, any upsetting of the axle 42 orientation can cause the rotatable members 46 to interfere with one another. This interference can compromise the ability of the guide 20 to provide a low-friction surface.

In FIG. 7B, the corners 56 have been rounded somewhat. The rounding lessens the interference somewhat, but it is still a potential problem. FIG. 7C illustrates a more preferred shape for the links 38. Links 38 of this shape largely eliminate interference with the channel 32 and greatly facilitate bending of the assembled guide 20. Theoretical radii as small as 5" can be accomplished without undesirable distortion of the channel 32 or the axle-positioning members 36.

FIGS. 5A and 6A illustrate preferred embodiments of a first strip 37 of the axle-positioning member 36. FIGS. 5B and 6B represent preferred embodiments of a second strip 35, which mates with the first strip 37 to form the complete axle-positioning member 36. To assemble the axle-positioning members 36, the manufacturer begins with the second strip 35. Hereinafter, the second strip 35 is referred to as the lower strip 35. However, those of skill in the art will appreciate that when the guide 20 is assembled, the second strip 35 may be oriented above the first strip 37.

The second strip 35 includes integral axles 42. In the illustrated embodiment, the axles 42 have different lengths. Those of skill in the art will appreciate that the axle 42 lengths may be varied in any manner to suit a particular application. For example, they may be of uniform height, they may alternate in height, as in FIGS. 5B and 6B, or they may increase steadily in height from one end of the strip 35 to the other.

During the manufacturing process, the lower strip 35 is positioned so that the axles 42 are oriented upward. The appropriate number of rotatable elements 46 are then placed upon the axles 42. As long as the axles 42 are oriented upward, gravity holds the rotatable elements 46 in place.

Because the preferred arrangement of rotatable elements 46 is an interlocked pattern, as shown in FIGS. 2 and 3, the axles 42 preferably receive the rotatable elements 46 in a proper sequence to avoid any rotatable elements 46 blocking the passage of neighboring rotatable elements 46 as they move down the axles 42 to their resting positions. One such method is to first place one rotatable element 46 on each axle 42 having no spacer 50, and then place one rotatable element 46 on each axle 42 having a spacer 50, continuing with this pattern until all rotatable elements 46 have been installed.

Once all rotatable elements 46 have been installed, the upper strip 37 is placed atop the ends of the axles 42. To aid insertion of the axle 42 ends into the sockets 44, a preferred embodiment provides a chamfer 48 on the ends of the axles 42 and/or within the sockets 44. If a number of lengths of strips are to abut one another, the transitions between adjacent strips can be smoothed by offsetting the upper strip 37. In this way, no seam in the upper strip 37 would be directly opposite a seam in the lower strip 35. This arrangement helps to minimize gaps between axles 42.

Alternatively, the ends of each strip can be provided with mating apparatus so that they can be securely attached to one another. For example, each strip could include male and female connecting portions on opposite ends.

Once the upper strip 37 is in place, the entire assembly is inserted slidably into the channels 32 of the support member 22. If a bent length of guide 20 is desired, the assembled guide 20 is bent in a manner described below.

FIGS. 8 and 9 illustrate a preferred method of bending the assembled device 20 using a three-roll bender. The bender includes an adjustable roll 58 and two stationary rolls 60. The cross-sections of each roll 58, 60 are shaped as mirror images of the surfaces of the support member 22 that each roll engages, as illustrated in FIG. 9. The adjustable roll 58 thus includes a center flange 62 to fit between the legs of the channel 28 on the back surface 30 of the support member 22, and upper 64 and lower 66 tapered sections to match the corresponding tapered sections on the back surface 30 of the support member 22. The stationary roll 60 includes upper 68 and lower 70 V-shaped surfaces to engage the corresponding upper 72 and lower 74 V-shaped surfaces on the front surface of the support member 22. The V-shaped surfaces on the front surface of the support member 22 are illustrated in detail in FIG. 4C.

These unique cross-sections on both the support member 22 and the bending rolls 68, 70 facilitate bending of the guide 20. A common problem when bending rolling guides is distortion of the channel 32 in which the axle-positioning member 36 fits. Such distortion can cause axle 42 misalignment and the problems associated therewith. The V-shaped surfaces 72, 74 on the exterior of the channel 32 together with the corresponding V-shaped surfaces 68, 70 of the roller 60 largely eliminate channel 32 distortion. The axles 42 thus remain aligned within the bent guide 20. Of course, as will be understood by those of skill in the art, the surfaces 72, 74 on the member 22 may be of any configuration to align with the surfaces 68, 70 of the roller 60 to facilitate predictable and uniform bending.

The design of the rolling guide 20 makes bending so easy that it may be performed by the guide 20 purchaser. Three-roll benders of the type used to bend these guides 20 are inexpensive to purchase or rent, and require little expertise to use properly. Thus, the guides 20 can be manufactured in standard straight lengths, keeping costs low, and bent by the purchaser to suit a particular application. Alternatively, the purchaser can request the guides 20 to be bent by the manufacturer prior to delivery. Because the guides 20 are so easy to bend, bending by the manufacturer does not significantly raise the cost of the guides 20.

FIGS. 8 and 9 illustrate the proper configuration to form an interior bend. Most curved conveyor sections require a guide 20 on both the interior and exterior side of the curve. Thus, to form an exterior bend, the adjustable roll 58 in FIG. 8 is exchanged for one having the same cross-section as the stationary roll 60 in FIG. 8, and vice versa. The assembled guide 20 is passed through the rolls 58, 60 in the opposite orientation as in FIG. 8, so that the rotatable element 46 surface faces the new adjustable roll 58.

FIGS. 10 and 11 illustrate two alternate embodiments of the axle-positioning members 36 of the present bendable rolling conveyor guide 20. In FIG. 10, the strips of the axle-positioning member 36 are formed such that every other link 38 has an integral axle 42. In FIG. 11, the ends of the axles 42 are formed without a chamfer.

FIG. 12 illustrates the present bendable rolling conveyor guide 20 disposed in a transfer operation. Conveyed articles typically need to be transferred from one conveyor to another as they travel through an industrial installation. Rolling conveyor guides 20, such as the one disclosed here, are typically needed in these areas to prevent problems such as jamming or tipping of articles.

FIGS. 13–21 illustrate alternate preferred embodiments of the present bendable rolling conveyor guide 80, 82, 104. These guides 80, 82, 104 include channels having a different cross-sectional shape from the guide 20 illustrated in FIGS. 1–12. As FIGS. 15, 16, 20 and 21 illustrate in detail, inner walls of the channels 84 include V-shaped surfaces, with the V's opening in opposite directions. A vertical cross-section of each channel 84 thus resembles an hourglass. A vertical cross-section of each axle-positioning member strip 86 is similarly shaped like an hourglass, such that the strips 86 fit snugly within the channels 84 in a mating engagement. The strips 86 are preferably slidable along the channels 84, as described above with respect to the guide 20.

With continued reference to the end views of FIGS. 15, 16, 20 and 21, an outward facing wall 88 of each channel 84 is V-shaped, with each V opening away from the interior of the channel 84. These outward facing walls 88 are adapted to engage and mate with complementary surfaces of a bending device, such as a three-roll bender. The guides 80, 82, 104 are thus easily bent as described above with respect to the guide 20. Complementary engagement of the outward facing walls 88 and the surfaces of the bending device enables the guides 80, 82, 104 to be bent without distortion of the channels 84. The guides 80, 82, 104 thus provide the same cost savings and other benefits of the guide 20 described above.

Figure 13:
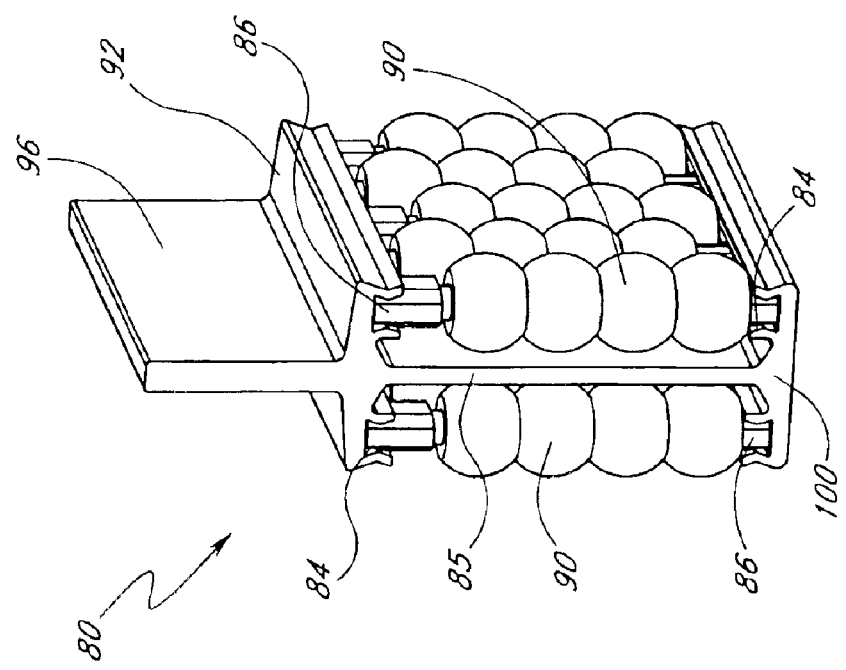
FIG. 13 is a perspective view of another preferred embodiment of the present bendable rolling conveyor guide.
Figure 16:
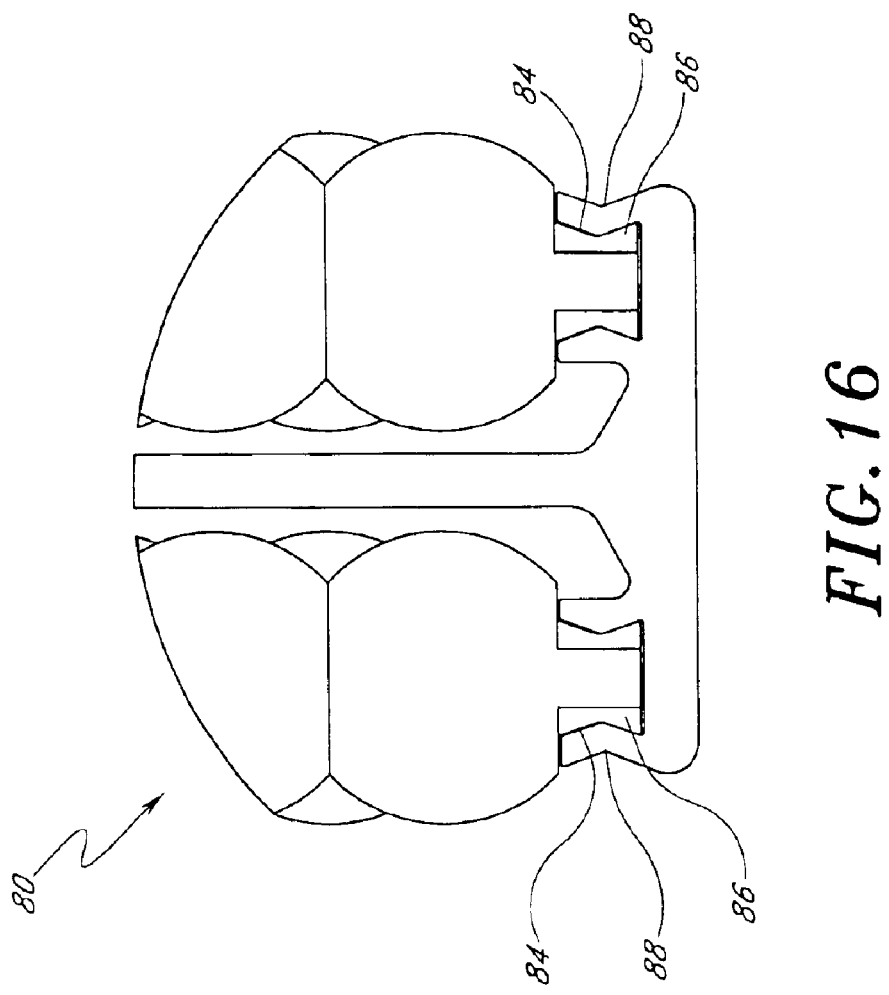
FIG. 16 is a side detail view of the lower portion of the bendable rolling conveyor guide of FIG. 13.
Figure 15:
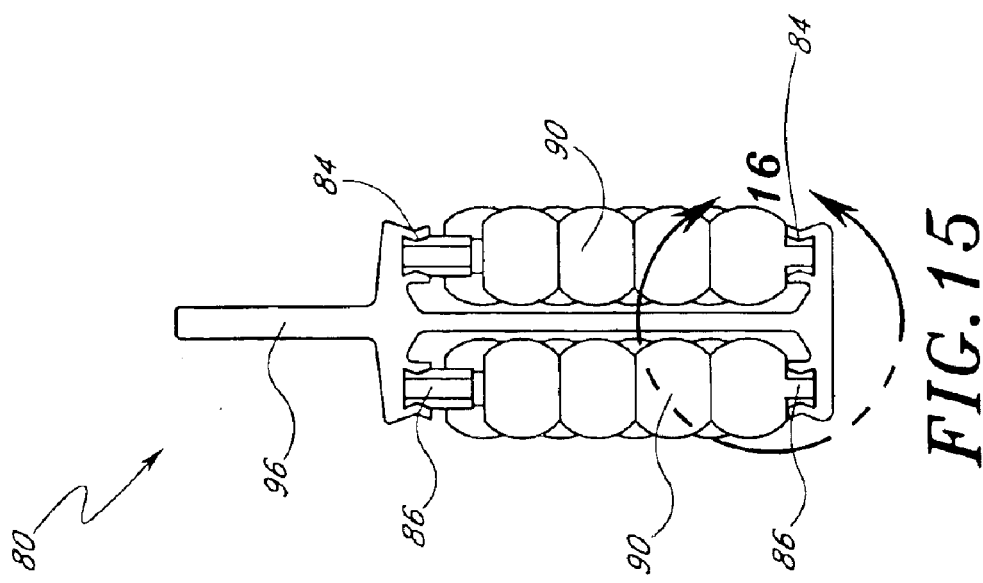
FIG. 15 is a side view of the bendable rolling conveyor guide of FIG. 13.
Figure 17:
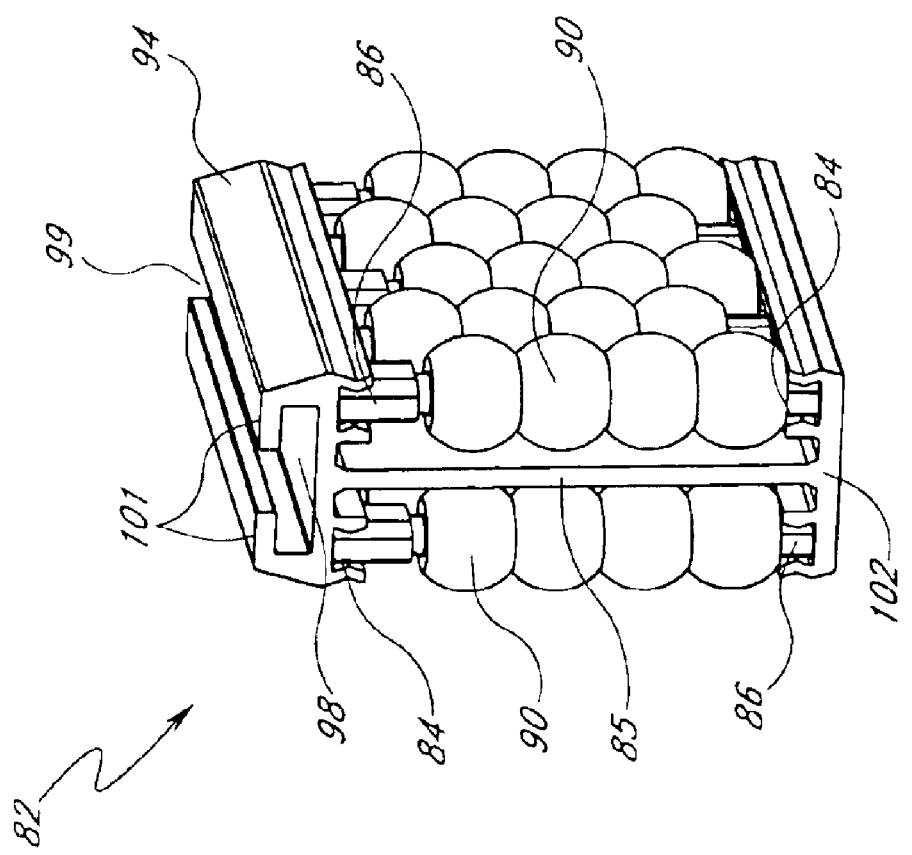
FIG. 17 is a perspective view of another preferred embodiment of the present bendable rolling conveyor guide
Figure 19:
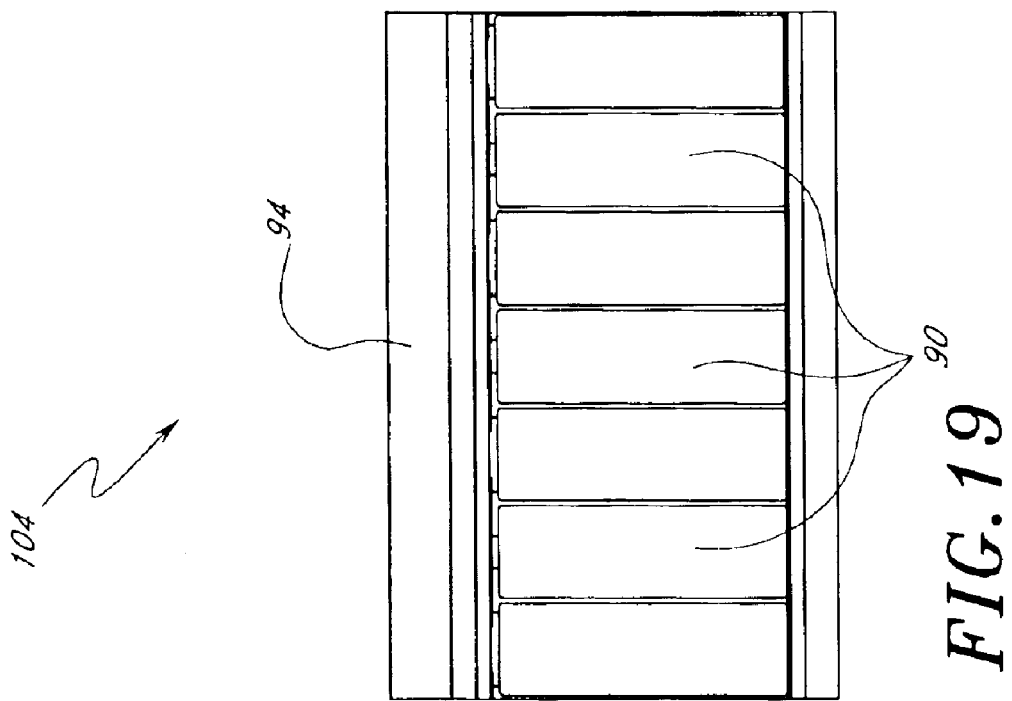
FIG. 19 is a front view of the bendable rolling conveyor guide of FIG. 18.
Figure 18:
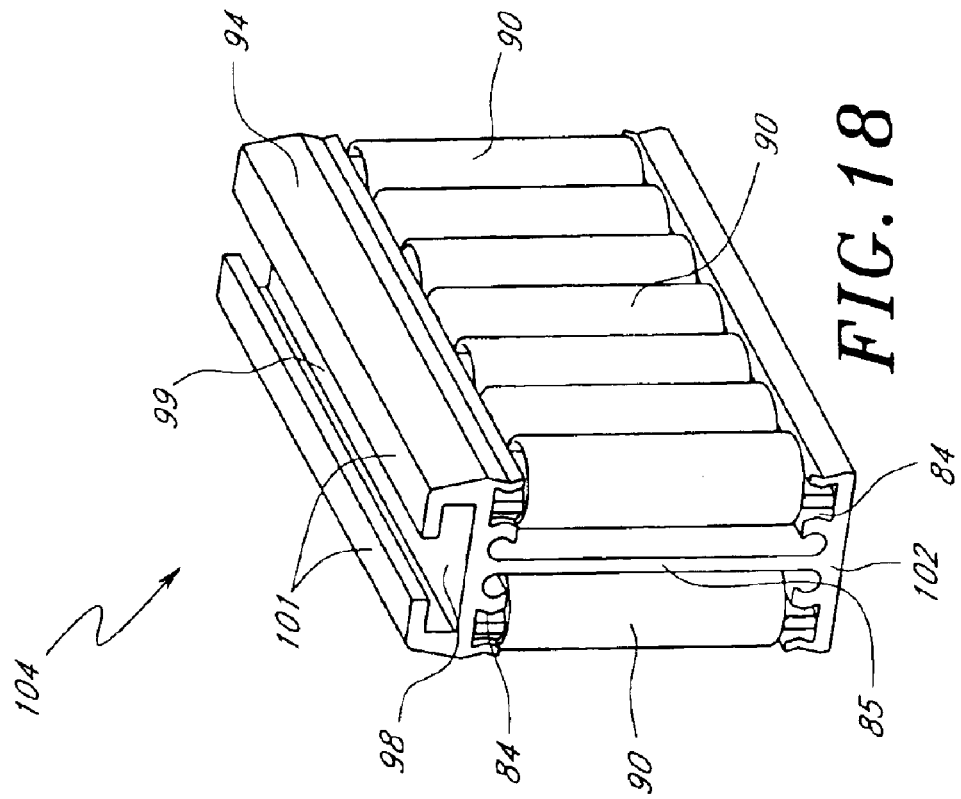
FIG. 18 is a perspective view of another preferred embodiment of the present bendable rolling conveyor guide.

With reference to FIGS. 13, 17 and 18, the guides 80, 82, 104 preferably include two pairs of vertically spaced channels 84 divided by a central wall 85. Each pair of channels 84 is adapted to receive axle positioning members, such that each guide 80, 82, 104 includes oppositely facing rotatable members 90. The guides 80, 82, 104 are thus adapted to be placed in between neighboring conveyors. In FIGS. 13 and 17 the rotatable members 90 comprise beads, while in FIG. 18 the rotatable members 90 comprise rollers.

An upper portion 92, 94 of each guide 80, 82, 104 includes apparatus that enables the guides 80, 82, 104 to be mounted between neighboring conveyors. The guide 80 (FIG. 13) includes an upwardly extending wall 96 that is an extension of the dividing wall 85. The upwardly extending portion 96 is adapted to engage mounting hardware, such as bolts, that secure the guide 80 in place relative to a conveyor.

The guides 82, 104 (FIGS. 17–21) include a channel 98 having an open slot 99 in an upper wall. A width of the slot 99 is less than an overall width of the channel 98, thus creating overhanging flanges 101 on either side of the slot 99. The flanges 101 are adapted to engage mounting hardware, such as a flat strip, or bolt heads, that secure the guides 82, 104 in place relative to a conveyor. Those of skill in the art will appreciate that the mounting apparatus 96, 98 could be located on the lower portions 100, 102 of the guides 80, 82, 104 rather than, or in addition to, the upper portions 92, 94.

The above presents a description of the best mode contemplated for carrying out the present bendable rolling conveyor guide, and of the manner and process of making and using it, in such full, clear, concise, and exact terms as to enable any person skilled in the art to which it pertains to make and use this bendable rolling conveyor guide. This bendable rolling conveyor guide is, however, susceptible to modifications and alternate constructions from that discussed above which are fully equivalent. Consequently, it is not the intention to limit this bendable rolling conveyor guide to the particular embodiments disclosed. On the contrary, the intention is to cover all modifications and alternate constructions coming within the spirit and scope of the bendable rolling conveyor guide as generally expressed by the following claims, which particularly point out and distinctly claim the subject matter of the bendable rolling conveyor guide.

What is claimed is:

1. An apparatus for guiding articles moving on a conveyor, comprising:
   a support structure including first and second spaced channels, an outward facing surface of each channel including features adapted to matingly engage a bending tool;
   an elongated first axle-positioning member slidably engaging the first channel;
   an elongated second axle-positioning member slidably engaging the second channel;
   at least one axle extending between the first axle-positioning member and the second axle-positioning member; and
   at least one rotatable element mounted on the at least one axle wherein the at least one axle is molded integrally at a first end as one piece with the first axle-positioning member.

2. The apparatus of claim 1, wherein a second end of the at least one axle is received in a socket formed in the second axle-positioning member.

3. An apparatus for guiding articles moving on a conveyor, comprising:
   a support structure including first and second spaced channels, an outward facing surface of each channel including features adapted to matingly engage a bending tool;
   an elongated first axle-positioning member slidably engaging the first channel;
   an elongated second axle-positioning member slidably engaging the second channel;
   at least one axle extending between the first axle-positioning member and the second axle-positioning member; and
   at least one rotatable element mounted on the at least one axle;
   wherein a second end of the at least one axle is received in a socket formed in the second axle-positioning member and the second end of the at least one axle is tapered, or the socket is tapered, to facilitate the entry of the at least one axle into the socket.

4. An apparatus for guiding articles moving on a conveyor, comprising:
   a support structure including first and second spaced channels, an outward facing surface of each channel including features adapted to matingly engage a bending tool;
   an elongated first axle-positioning member slidably engaging the first channel;
   an elongated second axle-positioning member slidably engaging the second channel;
   at least one axle extending between the first axle-positioning member and the second axle-positioning member; and
   at least one rotatable element mounted on the at least one axle wherein the outward facing surface of each channel has a substantially V-shaped cross-section.

5. The apparatus of claim 4, wherein each V-shaped cross-section opens toward its respective channel.

6. The apparatus of claim 4, wherein each V-shaped cross-section opens away from its respective channel.

7. The apparatus of claim 4, further comprising third and fourth spaced channels, an outward facing surface of each channel including features adapted to matingly engage a bending tool.

8. The apparatus of claim 7, wherein the outward facing surface of each channel has a substantially V-shaped cross-section.

9. The apparatus of claim 8, wherein each V-shaped cross-section opens toward its respective channel.

10. An apparatus for guiding articles moving on a conveyor, comprising:
    a support structure including first and second spaced channels, an outward facing surface of each channel including features adapted to matingly engage a bending tool;
    an elongated first axle-positioning member slidably engaging the first channel;
    an elongated second axle-positioning member slidably engaging the second channel;
    at least one axle extending between the first axle-positioning member and the second axle-positioning member; and
    at least one rotatable element mounted on the at least one axle;
    further comprising third and fourth spaced channels, an outward facing surface of each channel including features adapted to matingly engage a bending tool;
    wherein the outward facing surface of each channel has a substantially V-shaped cross-section; and
    each V-shaped cross-section opens away from its respective channel.

11. The apparatus of claim 4, wherein the support structure further comprises a flat projection from an upper surface thereof, the flat projection being adapted to engage mounting hardware to secure the apparatus along the side of a conveyor.

12. An apparatus for guiding articles moving on a conveyor, comprising;
    a support structure including first and second spaced channels, an outward facing surface of each channel including features adapted to matingly engage a bending tool;
    an elongated first axle-positioning member slidably engaging the first channel;
    an elongated second axle-positioning member slidably engaging the second channel;
    at least one axle extending between the first axle-positioning member and the second axle-positioning member; and
    at least one rotatable element mounted on the at least one axle;
    wherein the support structure further comprises a third channel in an upper surface thereof, the third channel being adapted to engage mounting hardware to secure the apparatus along the side of a conveyor.

13. The apparatus of claim 4, further comprising a plurality of axles.

14. An apparatus for guiding articles moving on a conveyor, comprising:
    a support structure including first and second spaced channels, an outward facing surface of each channel including features adapted to matingly engage a bending tool;
    an elongated first axle-positioning member slidably engaging the first channel;
    an elongated second axle-positioning member slidably engaging the second channel;
    at least one axle extending between the first axle-positioning member and the second axle-positioning member; and at least one rotatable element mounted on the at least one axle further comprising a plurality of axles;

further comprising at least one spacer positioned on at least one of the axles so that rotatable elements on at least one of the axles are offset with respect to the rotatable elements on adjacent axles.

15. The apparatus of claim 14, wherein the at least one spacer is formed integrally with one of the axle-positioning members.

16. An apparatus for guiding articles moving on a conveyor, comprising:

a support structure including first and second spaced channels, an outward facing surface of each channel including features adapted to matingly engage a bending tool;

an elongated first axle-positioning member slidably engaging the first channel;

an elongated second axle-positioning member slidably engaging the second channel;

at least one axle extending between the first axle-positioning member and the second axle-positioning member; and at least one rotatable element mounted on the at least one axle;

wherein the axle-positioning members have notched edges that facilitate curving of the axle-positioning members.

17. The apparatus of claim 16, wherein the axle-positioning members are flexible about an axis parallel to the at least one axle.

18. The apparatus of claim 16, wherein the support structure is rigid, such that it will not bend under loads applied during normal use, but the support structure is also bendable, such that it may be bent into a curved configuration prior to use.

19. A support structure of an apparatus for guiding articles moving on a conveyor, comprising:

an elongate rail having a substantially C-shaped profile;

a first branch of the C-shaped profile including a first channel; and a second branch of the C-shaped profile including a second channel spaced from the first channel; wherein an outward facing surface of each channel defines a V-shaped profile that is adapted to matingly engage a bending tool such that the rail is adapted to be bent without distorting either channel.

20. The support structure of claim 19, wherein each V-shaped profile opens toward its respective channel.

21. The support structure of claim 19, wherein each V-shaped profile open way from its respective channel.

22. A support structure of an apparatus for guiding articles moving on a conveyor, comprising:

an elongate rail having a profile shaped substantially as two C's arranged back-to back;

each C including first and second spaced branches, each of the first branches including a first channel, each of the second branches including a second channel; wherein an outward facing surface of each channel defines a V-shaped profile that is adapted to matingly engage a bending tool such that the rail is adapted to be bent without distorting either channel.

23. The support structure of claim 22, wherein each V-shaped profile opens toward its respective channel.

24. The support structure of claim 22, wherein each V-shaped profile opens away from its respective channel.

25. The support structure of claim 22, further comprising a wall extending upwardly from an upper surface of the rail.

26. The support structure of claim 22, further comprising an open channel in an upper surface of the rail.

* * * * *

UNITED STATES PATENT AND TRADEMARK OFFICE
CERTIFICATE OF CORRECTION

PATENT NO.         : 6,991,086 B2
APPLICATION NO.    : 10/789629
DATED              : January 31, 2006
INVENTOR(S)        : Stuart J. Ledingham It is certified that error appears in the above-identified patent and that said Letters Patent is hereby corrected as shown below:

Column 1, line 5, delete "2003" and insert --2003,-- therefor.

Column 5, line 35, delete "which-are" and insert --which are-- therefor.

Column 10, line 34, in claim 10, delete "comprising;" and insert --comprising:-- therefor.

Column 11, line 2, in claim 14, after "axle" insert --;--.

Column 12, line 15, in claim 21, delete "open way" and insert --opens away-- therefor.

Column 12, line 19, in claim 22, delete "back-to back;" and insert --back-to-back;-- therefor.

Signed and Sealed this

Fourth Day of December, 2007

JON W. DUDAS
*Director of the United States Patent and Trademark Office*